Patented Apr. 6, 1948

2,438,949

UNITED STATES PATENT OFFICE 2,438,949

ELECTRIC INSULATION COMPOSITION OF POLYVINYL CHLORIDE AND POLYALKYLENE POLYSULFIDE

Thomas Robertson Scott and Archibald Alan New, London, England, assignors to Standard Telephones and Cables Limited, London, England, a British company No Drawing. Application July 2, 1943, Serial No. 493,290. In Great Britain July 3, 1942

4 Claims. (Cl. 260—33)

This invention relates to electric insulating materials and has for its object to provide such material which will be a satisfactory substitute for rubber in the manufacture of field telephone wire and like electric cable used for electric communication at telephone frequencies.

An electric insulating material for this purpose must have a sufficiently low power factor and permittivity at telephone frequencies and a sufficiently high insulation resistance to permit a good transmission of speech when the exterior of the cable is in contact with a conducting medium such as the ground. In addition to permit of economical manufacturing methods the material must bond well to itself and must have sufficient plasticity to be forced into the interstices of cotton braid which has been tightly formed over the exterior of a conductor insulated with the material and yet be hard and tough enough and free enough from plastic flow in the final state to stand use as a field wire.

Hitherto rubber (mixed with various fillers such as mineral rubber and mineral fillers) has been the only substance meeting all these requirements, since in the unvulcanised state it will bond together satisfactorily and flows into the interstices of the braiding whilst by vulcanisation it is rendered hard and tough and largely free from plastic flow.

There is at present an acute shortage of rubber. Supplies of polymerised vinyl chloride are likely to be available in quantity in the near future. This substance does not bond with itself sufficiently for field wire purposes. It is the specific object of this invention to provide an electric insulating material comprising polymerised vinyl chloride which will be satisfactory for the insulation of field telephone wire. According to the present invention we provide an electrical insulating material which consists of a plasticiser therefor, an organic polyalkylene polysulfide obtained as a rubbery solid mass by reacting an organic dihalide with a water soluble alkaline polysulfide, for example, by reacting ethylene dichloride with sodium polysulfide. One such reaction product is substantially a co-polymerized olefine disulfide. The mixture may contain also vulcanising ingredients and mineral fillers.

We have found that polymerised vinyl chloride can be successfully milled with those organic polyalkylene polysulfides provided a certain amount of plasticizers for both substances is added. Substances that act as accelerators of vulcanisation of rubber act as plasticisers of these organic polysulphides and in amounts comparable with those which are added to rubber as vulcanisation accelerators. Plasticisers for polymerised vinyl chloride comprise tricresylphosphate, dibutyl phthalate, coal tar pitch and coumarone resin.

Example 1

A mixture of 50% polymerised vinyl chloride and 50% plasticiser therefor, the plasticiser consisting of equal parts of tricresylphosphate and dibutyl phthalate was milled hot for 20 minutes. To this was added half its weight of a mixture made by milling together the following ingredients, placed in the mill in the order stated:

| | Parts by weight |
|---|---|
| A rubbery solid polyalkylene polysulfide | 500.00 |
| Diphenyl guanidine | 1.25 |
| Trimethylthiuramdisulphide | 2.00 |
| Soft gas black | 125.00 |
| Zinc oxide | 50.00 |

This yielded a mixture having a power factor of 0.216 at 1 k. c. per second. The mixture bonded well and formed a satisfactory vulcanisable covering for telephone field wire. The final mixture contains 24.4% of the organic polyalkylene polysulphide.

Example 2

Similar mixtures made in a similar manner to that of Example 1, but containing 20% and 30% respectively of the organic polyalkylene polysulphide also bonded satisfactorily together when unvulcanised and subsequently could be vulcanised.

Example 3

The same mixture of polymerised vinyl chloride and plasticiser as in Example 1 was hot milled for 20 minutes and then milled with half its weight of a mixture made by placing in a mill the following ingredients in the order stated:

| | Parts by weight |
|---|---|
| A rubbery solid substance that is substantially a co-polymerized olefine disulfide | 500.00 |
| Diphenyl guanidine | 1.00 |
| Benzthiazyl disulphide | 1.75 |
| Soft black | 300.00 |
| Zinc oxide | 50.00 |

This yielded a mixture having a power factor of 0.124 at 1 k. c. per second. The mixture bonded well and formed a satisfactory vulcanisable covering for telephone field wire.

What is claimed is:

1. A solid rubber-like electrical insulating composition, sufficiently hard and tough for use as the external covering of field wire and substantially free from plastic flow at ordinary atmospheric temperatures, that comprises a mixture containing the following components in the proportions, based on total weight of the mixture, as follows:

| | |
|---|---|
| Plasticized polyvinyl chloride comprising equal parts of polyvinyl chloride and plasticizer | Two-thirds |
| A rubbery solid organic polysulfide consisting of the reaction product of an aliphatic alkylene dihalide with a water-soluble alkaline polysulfide | 20%–30% | the remainder of the mixture comprising a rubber vulcanization accelerator to serve as a plasticizer for the rubbery solid organic polysulfide component.

2. A composition as defined in claim 1 wherein the proportion of the rubbery solid organic polysulfide present in the composition is 20%, based on total weight of the composition.

3. A composition as defined in claim 1 wherein the proportion of the rubbery solid organic polysulfide present in the composition is 30%, based on total weight of the composition.

4. A solid rubber-like electrical insulating composition, sufficiently hard and tough for use as the external covering of field wire and substantially free from plastic flow at ordinary atmospheric temperatures, that comprises a mixture containing the following components in the proportions, based on total weight of the mixture, as follows:

| | |
|---|---|
| Plasticized polyvinyl chloride, comprising equal parts of polyvinyl chloride and a plasticizer composed of equal parts tricresyl phosphate and dibutyl phthalate | Two-thirds |
| A mixture consisting of a rubbery solid organic polyalkylene polysulfide, 500 parts by weight; diphenyl guanidine, 1.25 parts by weight; trimethylthiuramdisulphide, 2.00 parts by weight; soft gas black, 125.00 parts by weight, and zinc oxide, 50.00 parts by weight | One-third |

THOMAS ROBERTSON SCOTT.
ARCHIBALD ALAN NEW.

REFERENCES CITED

The following references are of record in the file of this patent:

UNITED STATES PATENTS

| Number | Name | Date |
|---|---|---|
| 2,332,194 | Beekley et al. | Oct. 19, 1943 |
| 2,080,363 | Stocklin et al. | May 11, 1937 |
| 2,292,441 | Habgood | Aug. 11, 1942 |
| 1,962,460 | Patrick | June 12, 1934 |
| 2,357,350 | Oakes | Sept. 5, 1944 |
| 2,363,614 | Patrick | Nov. 28, 1944 |

OTHER REFERENCES

Schatzel et al., article on pages 945–948, Ind. & Eng. Chem., Aug. 1939.